April 21, 1931.  A. THOMA  1,801,463
SHEETLIKE SHOE FILLER.
Filed Sept. 3, 1926
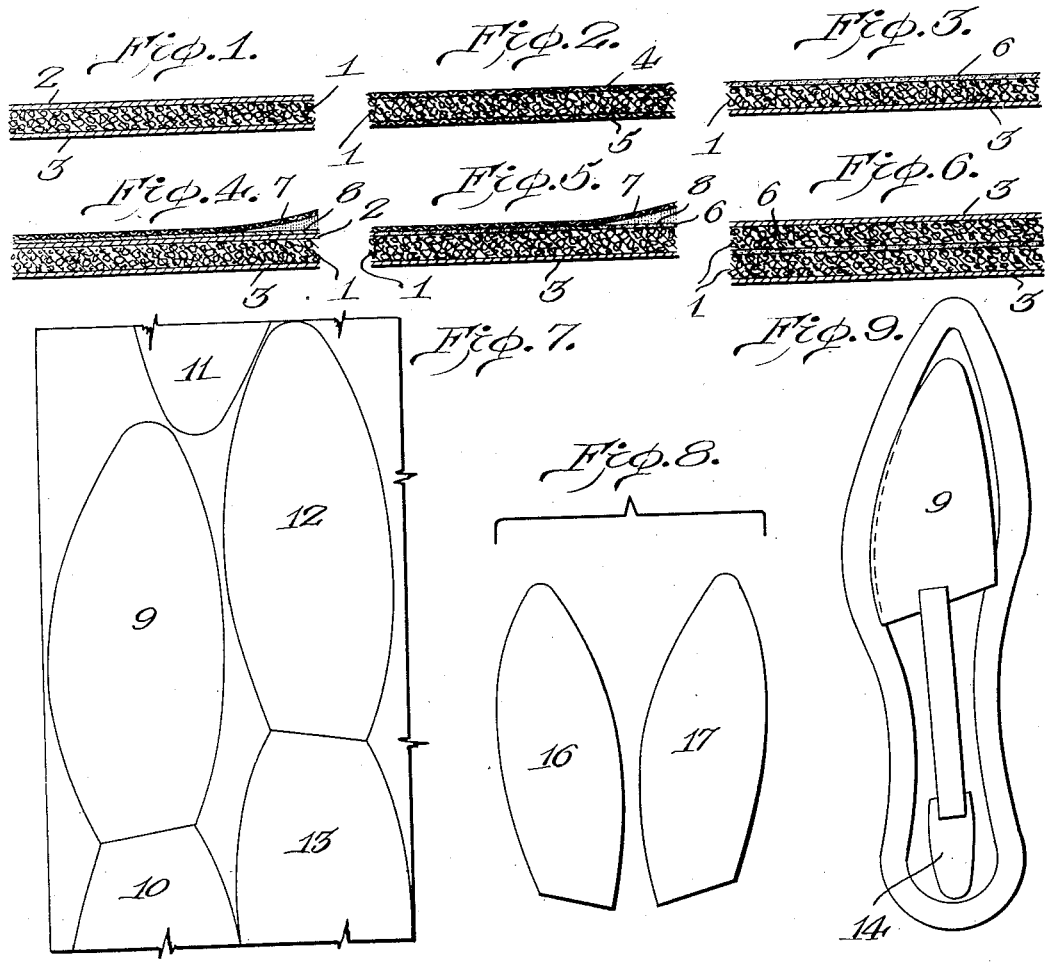
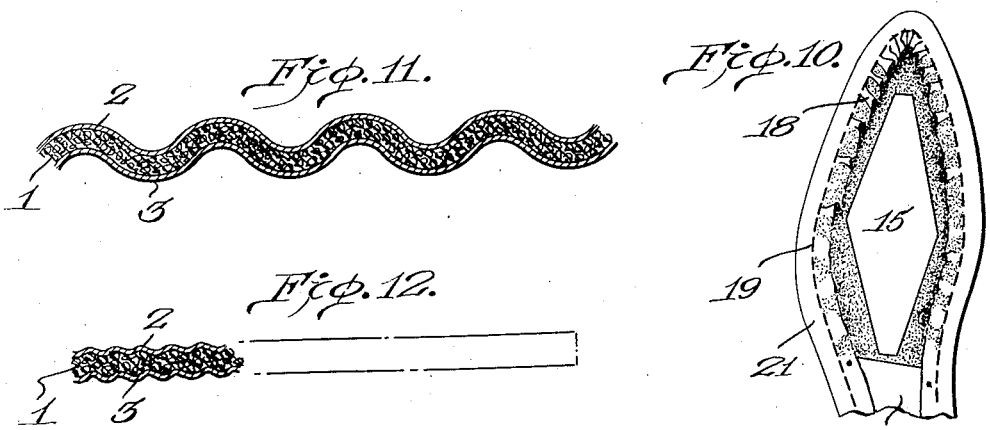
Inventor
Andrew Thoma
By Roberts, Cushman, Woodberg
Attorneys Patented Apr. 21, 1931

1,801,463

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

SHEETLIKE SHOE FILLER

Application filed September 3, 1926. Serial No. 133,506.

This invention relates to the provision of a shoe-bottom filler in the form of a self-contained and normally self-suporting and shape-retaining unit or piece, as an article of manufacture, adapted for filling a single shoe-bottom cavity when laid therein and spread by pressure. Such filler may be shipped by the manufacturer in individual or died out pieces, or in flat sheets or rolls to be cut or died out in accordance with the sizes and shapes of the shoes or other preferences of the shoe manufacturer.

The primary object of the invention is to simplify, cheapen and improve the present shoe-filling process by doing away with the expensive, laborious and untidy machines now required for preparing and applying the common, plastic bulk filler in welt shoe manufacture, by providing, as articles of manufacture, ready made filler units capable of being shipped, stored and handled and applied as units to the shoe-bottom cavity, thus eliminating in large part the requirements of skill, labor, time and expense heretofore incidental to the preparation and laying of bulk shoe filler.

In its broadest aspects the invention consists in the provision of such units made in the form of individual pieces sufficiently unified and coherent to be shape-retaining, self-sustaining, and adapted for shipping, storing and handling as units, but yet spreadable and adhesive so as to conform to the contour of the shoe-bottom cavity and adhere thereto when laid in the shoe bottom and subjected to leveling or other pressure. Generic claims of this character have been divided out of this application and are contained in a separate application filed by me August 6, 1928, Serial No. 297,630, along with certain species. The present application is restricted to other species and features, as defined in the claims, chief of which is the provision of a filler piece, preferably in laminated form, containing a spreadable element of shoe-filler material combined with a reinforcing or shape-maintaining element to preserve the shape and integrity of the piece for transportation, storage and handling prior to spreading in the shoe bottom. The reinforcing or shape-maintaining element is preferably a sufficiently tough and non-extensible sheet or web to stiffen, support and hold the plastic filler material together as a unit, such as paper or other fabric; it is preferably combined with the filler material as a cover or skin, on one or both sides, and is preferably impregnated with wax tailings. A separating dusting of talc or other anti-sticking and anti-squeak material is preferably applied to at least one side of the piece; and a strip-off sheet or protective layer is preferably applied to at least one side of the piece, especially if the piece would otherwise be externally sticky for handling. The spreadable shoe-filler element may be a plastic filler composition of the general type shown in my various plastic filler Patents Nos. 832,002; 855,868 and my subsequent patents and applications, and is preferably of a consistency capable of being spread cold.

In manufacturing this article I preferably use two sheets of paper, saturated in a heated bath of wax tailings, or combinations of oil, or combinations of oil and resins or waxes, thereby rendering the paper water-repellant and capable of retaining the subsequently inserted plastic layer. Between these two webs of paper thus treated, I insert a thin layer of ground cork or like comminuted or segregated body material treated with or intermixed with a sticky binder. This plastic filler material of binder and body material may be introduced in any desired manner, preferably by being passed between heated elements, such as rolls, so as to reduce it to the desired thin layered condition just as it is laid or delivered between the webs of paper.

The resulting sheeted product consisting of the two outer layers of treated fabric and the inner layer of granular or segregated insulating material, when made as above explained and especially when united and sheeted between hot rolls and under the influence of heat, forms a more or less soft or pliable sheet which when cooled may be compressed to a firmer, stronger consistency. The binder and cementing agent of the granular mass binds said mass together and also binds the mass and the paper together as one whole laminated structure.

Preferably, in view of the use to which the sheeted material is to be put, I provide a considerable looseness or slight instability of the inner granular layer of cork or other comminuted body material. This inner composition when in its heated condition, cannot be closely packed between the web or apron-like enveloping layers of paper, so that when the finished sheet has been formed, it is subject to further compression under pressure which results in its being capable of spreading or flowing sluggishly or being caused to exude laterally from between the protecting cover skins or integuments which embrace the spreadable layer so as normally to constitute the leaf, sheet, or piece, as explained. This pad-like feature or characteristic is especially advantageous for filling the bottoms of McKay shoes, where a thinner layer of filler is required than in a welt shoe. When it is died into the small pieces required, it is almost impossible to make said pieces conform to the shape of the shoe-bottom cavity, and my invention renders it unnecessary to even attempt to make the pieces conform to the shape. The small piece is simply cut from the pad-like sheet, and fastened to the bottom of the shoe-bottom cavity by cement or any suitable means and the outer sole is then placed over it in usual manner, and then fastened to the shoe. It will be understood that the small piece which has been cut from the sheet rests not only on the cavity which it is to fill, but sometimes rests more or less over the gathered-in edges of the upper materials. If this piece of sheeted material were unyielding and not pad-like and compressible, this overlapping of the folded or gathered-in edges of the upper materials, would produce a ridge to the subsequent discomfort of the wearer of the shoe and the ultimate distorted appearance of the shoe.

Having applied the sole as stated, the usual levelling pressure is brought to bear upon said sole and shoe bottom, and because of the yielding, compressible nature of my pad-like filler piece, the desired even bottom is secured. The filler piece compresses and yields in whatever direction the cavity and its overlying edge of crimped upper leather and shoe lining require, the semi-plastic or moldable layer between the enclosing protecting webs or sheets, spreading or squeezing out, up, down, or in, as required, and thereby conforming accurately to the differing peculiarities of each shoe bottom automatically under the severe pressure of the levelling machine. In other words, my invention results in producing, in an inexpensive and simple manner, the same proper shape and evenness of shoe bottom in a McKay shoe that has heretofore characterized the welt shoe. The pad-like piece allows itself to be compressed and alined to its surroundings, without requiring any skill or attention from the operator, as this automatic compressing and alining is accomplished by the regular levelling step in the shoe manufacture, which is always required for molding the sole and bottom. In the cheaper McKay shoes, it has sometimes been the custom to put in a piece or filling consisting of a cut-out or died piece of tar paper or cork board, the reason for the use of such filling piece being the necessity in the first place of filling the cavity with something, and the necessity in the second place, of avoiding the expense of filling said cavity with hot plastic filler in the manner common in welt shoes. My invention avoids this expense, while at the same time securing the same even bottom. It secures the advantages of the expensive mode of filling and eliminates the disadvantages of the cheap mode of filling, while itself being equally as cheap as the latter mode.

My novel material provides not only a pad-like yielding layer, but when once compressed and conformed to the cavity and irregular boundaries of said cavity, it is thereafter confined within its place in the shoe bottom so that it is non-shifting, while at the same time completely waterproofing and insulating said shoe bottom. Because of its resulting compactness due to the compression and molding of it under the levelling machine, it gives the sole a uniform support at all points, which has heretofore been impossible through the use of sheeted cork board or any other form of sheeted material used in the manufacture of McKay shoes.

The enveloping webs of paper or other layers constitute protection against displacement of the fibrous mass, and against the sticky surface of the binder. The yielding quality of the contained composition may vary in accordance with the mixture selected, as will be readily understood by those familiar with these plastic shoe bottom fillers as set forth in my previous patents before mentioned. Also I wish it understood that a further advantage of this product resides in the fact that the sheet, when once prepared and cooled, can then be compressed to a greater firmness, so that it becomes practicable to corrugate it and impress it with any suitable pattern, as for instance if it is to be used for shoe bottom insulating purposes, the sheets may be provided with cavities or air pockets, thereby increasing the insulating function. For shipping purposes I usually smother or dull or deaden the envelope (particularly when its waterproofing has been of a sticky nature) by subjecting the sheet to a complete dusting with soapstone, talc, or like inert powdered material to render the sheets non-adhesive to one another, or to render them slippery when so required, or to protect their surface from injury. This treatment of the product has an advantage in connection with shoe manufacture, in which case the died-out piece may be stuck or cemented simply to the bottom of the cavity and left unattached to the sole, thereby permitting the sole to have a slight slipping movement with relation to the inserted layer. In a McKay shoe this is of real advantage, as it eliminates the tendency to squeak in walking, which has always been common in McKay shoes. The combination of the talc, for instance, with the wax tailings, for instance, is a perfect anti-squeak. The sticky binder is preferably permanently sticky so as to maintain the gripping or compactly held body of filler always intact. In other words, if the warmth of the foot or the external pressure should shift or tend to shift one particle of filler with relation to another particle, the binder would not permit actual slipping but would simply take a new hold on the particles. It would yield or change its hold or grip on the cork granules in and among the compressed mass but still make said mass stay in place as placed and compressed.

My product may be died to any shape and then compressed into an infinite variety of usable forms or shapes, this compression being due to the loosely placed inner layer of my novel construction, whether this process is performed under special temperatures or not. In place of plain paper or treated paper, fabrics of various kinds may be used, whenever a specific use is intended for the sheeted material where enveloping strength is sought or where special lightness in weight, insulation or moisture-proofing qualities or other features are sought.

A modification of the preferred embodiment of my invention, as above set forth, consists of providing the pad-like granulated layer of filler compound on only one supporting web, or in other words, omitting the paper or fabric on one side of the composite sheet. For instance, in dieing out rights and lefts (the filling pieces when first placed in the shoes should conform to the shoes to this extent at least), two sheets are placed face to face and then cut through simultaneously, so that the same die stroke forms a right piece in one sheet and an identical left piece in the other sheet. When said sheets are made so as to consist of one layer of paper or fabric and a superposed layer of filler compound and the latter is dusted with the inert powder and especially if finely granulated cork or similar dry, non-absorbent fiber is mixed in with the talc or other powder when dusted over the sticky surface or face of the filler layer, a similar sheet may be laid thereon in reverse position and then, after cutting, the cut pieces will readily separate along the dusted surface as a plane of natural cleavage. For shipping purposes I contemplate providing a thin textile or other strong, tough and suitable web on one side of the filler or composition layer, the other side having preferably also a similar web or paper web or other fabric web, said first mentioned textile or tough web, to be stripped off from the filler (or other) layer before its use, for instance in the shoe bottom.

I have given no formulæ for compounding the inner layer of granulated or fibrous material, as any of the large variety of mixtures of body materials and binders enumerated in my various patents before mentioned, may be used wherever suitable for any given purpose.

The practical embodiments of my filler sheet and leaf or small individual piece are numerous and various features of the invention are set forth in various copending applications hereinafter mentioned. In the accompanying drawings I have illustrated graphically what has thus far been explained. In the drawings, Figure 1 is a fragmentary cross section of a simple form of the sheet or leaf shown on a somewhat enlarged scale;

Figures 2-6 are similar fragmentary sectional views of the further development of the filler leaf or sheet;

Figure 7 is a plan view of a fragmentary portion of a sheet illustrating how the individual filler pieces may be died out with little waste;

Figure 8 shows two of the pieces as died out or cut from two sheets placed as shown in Fig. 6, thereby simultaneously making a right and a left filler piece.

Figure 9 is a top plan view of a shoe-bottom prior to receiving the outer sole showing the bottom of a McKay welt shoe with my filler piece in place ready to receive the sole;

Figure 10 shows a forepart of a McKay shoe-bottom which has been filled by the filler piece and method of filling as herein disclosed, the sole having been cut off from the shoe-bottom to reveal clearly the aforesaid;

Figures 11, 12 and 13 are fragmentary vertical sectional views of other forms of the sheet filler, illustrative of the intended scope of the invention.

The filler sheet or leaf or whatever the piece of filler material may be called, comprises primarily an intermediate layer 1 of spreadable, or plastic, compressible shoe filler, and top and bottom protecting sheets of various materials and constructions, Fig. 1 showing enclosing layers 2, 3 of paper or paper-like material. This cover sheet material is preferably saturated in a heated bath of wax tailings or combinations of oil or of oil and resins or waxes so as to render the paper water-repellant and capable of retaining properly the plastic layer 1. Fig. 2 shows protecting sheets 4, 5 of textile fabric or other sheet-like fibrous material. Fig. 3 shows a protecting top surface 6, of powdered soapstone, talc or like inert powdered material to render the filler sheets non-adhesive to one another or to render them slippery for introducing an anti-squeak feature into the shoes or to protect the surface of the filler sheets or pieces from injury in shipping, handling and use. This inert material is shown in Fig. 3 as intermingled or combined with the wax tailings binder of the layer 1 or whatever the sticky binder may be. Finely granulated cork or similar dry non-absorbent fibre is preferably mixed in with the talc or other powder when dusted over the sticky surface or face of the filler layer. Figure 6 shows two filler sheets of this construction laid against each other so that the inert powder layer 6 is between the two plastic layers 1 of spreadable filler material to constitute a separating layer or plane of natural cleavage when the two filler sheets are stripped from each other after dieing or cutting. In Fig. 4 I have shown a strip-off web or layer 7 of textile or tough web-like material detachably cemented to the cover piece 2 by any cementitious material 8 suited to hold said strip-off sheet in place for transportation and handling and yet permit it to be stripped off when the filler piece is to be used. In Fig. 5 a similar strip-off sheet 7 is shown applied to the filler piece of Fig. 3.

It will be understood that the various layers of cover material may be employed interchangeably and in a variety of combinations according to the economy and preferences of the manufacturer or the desires of the users, the above arrangements being illustrative and preferable.

In Fig. 7 I have shown a fragment of a sheet to illustrate the way that the cutting may be effected, said figure showing the arrangement of filler leaves or individual pieces 9, 10, 11, 12, 13 of the style of filler piece shown in Fig. 9 but I wish it understood that I do not undertake herein to set forth any particular preferences as to the shape in which the filler pieces are to be cut as it is merely necessary that they contain enough of the plastic filler material to fill the shoe-bottom according to the requirements of modern shoe manufacture. This leaves an infinite variety of choice as to the particular shape of the piece. Fig. 10 shows a polygonal piece, 15. In Fig. 8 I have illustrated right and left filler pieces 16, 17 cut simultaneously by placing two sheets face to face as in Figure 6 and then cutting through the two sheets simultaneously so that the same die stroke forms a right piece in the one sheet and an identical left piece in the other sheet.

Figs. 11, 12 and 13 illustrate filler sheets corrugated or impressed with different shapes being otherwise constructed the same as shown in Figs. 1-5. This corrugated form operates to store an extra amount of the plastic interlayer in a given width or length of filler. Also the pressure of the filling operation or bottom levelling pressure acts to expand the otherwise inextensible layers 2, 3. In other words the filler piece is thereby given a capacity of expansion in area whether spreadable or not. The spreadable layer is expansible in varying extent of area and contour whereas the non-spreadable leaf is expansible to an unvarying extent in area and contour, under the application of pressure. This feature is more fully set forth in the copending application of A. H. Avery Ser. 212,747, filed August 13, 1927, where this species is claimed as such.

By the use of my invention, all the shoe filling operator has to do is simply to place a piece in the shoe-bottom cavity, or it may be, on the inner face of the outer sole (this new method being more fully explained and duly claimed in my application Ser. No. 210,558, filed August 4, 1927). No application of a hot roll or other special applying tool to shape the filler as heretofore is necessary. As soon as the filling operator has simply placed the piece in position, the outer sole and rest of the shoe-bottom are assembled together at once and secured, with said filler piece then lying between the inner sole and the outer sole. The expanding of the filler layer then takes place cold under vertical pressure, preferably the regular levelling pressure, as it shapes the shoe-bottom. This levelling pressure shifts all or it may be a portion only, of the filler piece to conform to irregularities of depth and contour of the shoe-bottom cavity. As herein shown and described, the piece expands, and preferably spreads or extrudes, laterally outward, i. e., from the center toward and against the periphery of the cavity, although not necessarily, the claims herein being intended to be generic to a structure or piece shiftable in any direction, as for instance inwardly from said periphery toward the center as disclosed and claimed in my copending application Ser. No. 212,018, filed August 10, 1927.

In case the filler piece contains a strip-off protector 7, it is placed in position and the said strip-off piece is then removed, or said strip-off piece is removed before it is put in position. Certain of the claims herein are intended to cover the feature of a removable cover layer broadly whether embodied in the specific form of a strip-off protector or not, several other species of embodiment being set forth and claimed in my copending application Ser. No. 183,302, filed April 13, 1927. Removal of this cover layer 7 renders the sticky adhesive available for sticking to the adjacent leather, the broad claims for a filler piece provided with an adhesive being herein contained as well as the claims covering an active adhesive; and a latent adhesive and certain other species are covered in the last mentioned application above. The filler piece is self-shaping and as an article of manufacture laminated, at least one layer being expansible with relation to the other and preferably one layer consists of sticky material, preferably the piece has a sticky interior and a non-sticky exterior, and at least one of the layers has a contour of fixed shape and another of the layers has a variable contour, and preferably it is variable as to area as well as contour, all of these functions resulting from the responsiveness of the piece to vertical pressure when in a shoe-bottom cavity so that one portion of the piece is capable of being rendered by said pressure thin to fit the ball portion of the cavity while the rest of the piece becomes enlarged in area by squashing out to fit the irregularities of said cavity whatever that may be. In a McKay shoe this spreading is preferably sufficient to fill all the small open spaces formed by the folds or pleats 18 of the upper. The pressure of the levelling machine squeezes the plastic filler layer outward (in the form shown in Fig. 10) until stopped by the row of stitches 19, which hold tightly together the innersole 20, crimped upper 21, and outer sole (not shown), with the result that the filler operates to weld together or cementitiously unite as a single unit the four elements of the McKay shoe-bottom just mentioned, the outer sole, innersole, crimped upper therebetween, and the plastic filler. This is a new McKay structure made possible for the first time by my new filler piece and method. The plastic layer preferably consists of a smeary adhesive binder and comminuted cork, reinforced by shape holding means on at least one side capable of stiffening the plastic layer so as to render it self-supporting for shipping and handling, said sheet-like piece being preferably flexible and waterproof, moldable and coherent. The shape holding or shape determining layer is preferably in the form of a cover piece and preferably on both the top and bottom of the filler piece. This laminated filler piece, as herein shown and described, has layers with different coefficients of expansion and preferably different coefficients of compressibility, of hardness, of adhesiveness, all as apparent from the description thus far and as set forth in the claims. The wide range or varieties of structural embodiments of my invention is already apparent from the foregoing description. I have already mentioned that at least one of the layers is preferably spreadable and another preferably fixed or unalterable in shape and that other layers may be adhesive, active or latent, and that the protector cover or shape holding layer is preferably paper, or a paper-like material, so as to be pliable and yielding to pressure to conform to its surroundings in the shoe-bottom cavity and yet provide a smooth, level surface, sufficiently permanent, durable, non-bunching, and not readily frangible, but I have also disclosed other forms of cover materials, and in my copending application Ser. No. 183,302 I have claimed certain other species, subordinate to the generic claims herein contained. The paper-like material may be fibrous or otherwise, preferably tough, flexible and non-stretchable as compared with the spreadable filler material, and preferably impervious and waterproof. When the outer surface is normally sticky, or sticky when made as a sheet, and then dulled or dusted with inert powder, preferably mixed with fibrous granules or particles, and preferably containing slippery particles, the whole rendering the surface sufficiently dry for packaging purposes and yet slippery for anti-squeak purposes in the shoe-bottom, it may be protected for purposes of handling and shipping by a protecting covering as already set forth in connection with the explanation of the strip-off layer feature. This feature of providing a removable cover protector over the filler piece proper may be applied to any selection of elements and combinations of parts within the disclosure of my invention and capable of making a usable filler piece. The purpose of the removable protector is to insure that the filler piece shall be kept in the best condition for instant use whenever the shoe manufacturer is ready to use it. For instance if said filler piece contains within itself the means for rendering it externally sticky it is a very desirable feature to restrain this assertion of stickiness by protecting means until the moment the stickiness is required. So likewise if an outside layer is frail and liable to break or go to pieces it is equally desirable to have a temporary protector such as the tear-off sheet 7 or other forms of protector set forth and claimed in my application Ser. No. 183,302, as already mentioned. Such a frail outside surface is one made in whole or in part by the dusting, or dulling materials mentioned, which may be protected and held properly in place by such a removable cover layer.

As the levelling pressure brings all the parts into unitary relation so as to form the entire bottom into a single unit with all the parts immovable or non-shiftable with relation to each other it will be evident that the shape holding layer of the original filler piece, having been pressed down, or in case the filler piece has both a top and bottom shape holding layer, said layers having been pressed together or towards each other and necessarily so held by the levelled and molded bottom, the plastic portion of the filler piece cannot shift back again but is held as spread by reason of the interposed barrier or stop now constituted by the original enclosing layer or layers 2, 3. I use the word sheet to mean a broad expanse of material rolled or made thin, but irrespective of whether large or small, and whether in a web or cut up into single sizes for individual shoes, whereas I use the term piece in a broad and different sense to mean simply a single article or thing produced, large or small, but without necessarily being a sheet or sheet-like unless so specified in the context.

My invention is particularly advantageous to McKay shoe manufacture for the reasons already mentioned and also because any of my patented types of plastic filler may be thereby made, as an article of manufacture, into as thin sheets as required for McKay shoes, while at the same time introducing to the McKay shoe all the well recognized advantages of a plastic moldable self-shaping shoe filler.

This patent is intended to be foundational or basic in character and accordingly it will be understood that a wide range of mechanical and chemical embodiments is embraced within the scope of its claims and that most of the previously patented plastic fillers come within the range of availability for the plastic portion of my new filler sheet and the pieces cut therefrom.

My invention is further described and defined in the form of claims as follows:

1. A sheet-like shoe filler piece, comprising a layer of normally plastic spreadable filler material including a smeary adhesive binder and comminuted cork, combined with a shape-holding sheet for reinforcing said layer whereby normally to preserve its shape.

2. A sheet-like shoe filler piece comprising a layer of plastic, spreadable and adhesive shoe filler material and a reinforcing sheet at one side at least of said plastic layer for stiffening it whereby normally to preserve its shape.

3. As an article of manufacture, the herein described multilayer sheet, at least one layer of which consists of an outside supporting cover, and another layer of which consists of moldable spreadable shoe-bottom filler material.

4. As an article of manufacture, a shoe-bottom filler sheet, comprising a layer of flexible and spreadable, sticky, waterproof material, and a supporting, shape-retaining layer of fabric secured permanently together, said sheet being normally firm and stable but capable of being molded and spread in a shoe-bottom under heavy pressure.

5. A shoe-bottom filler in the form of a self-contained piece adapted for filling a single shoe-bottom cavity, comprising a layer of filler material which is capable of flowing readily under shoe-levelling pressure at normal temperatures, said layer having an outer skin on at least one side which is relatively inextensible.

6. A shoe filler piece, comprising a layer of paper-like waterproof material and a layer of a filler material of a permanently adhesive character normally capable of spreading under shoe-levelling pressure.

7. A shoe filler piece comprising a layer of shoe filler material which is permanently sticky and capable of flowing under compression at normal temperature, said layer having a sheet of relatively tough material, the outer surface of said sheet having a dusting of non-sticky material.

8. As an article of manufacture, a multilayer sheet fabric, at least one layer of which consists of an outside supporting cover, and another layer of which consists of moldable and spreadable shoe-bottom filler, said sheet fabric having an outside dusting or separating material.

9. A filler piece of sheet-like form having a layer of filler material comprising a comminuted solid and a fluid sticky binder, and a sheet of paper-like material adhering to one surface at least of said layer, said sheet being impregnated with the binder, and means coating the outer surface of said sheet to make it slippery and non-adhesive.

10. As an article of manufacture, a pad-like sheet fabric, comprising a thin layer of ground cork or equivalent comminuted material united in a flexible layer by a waterproof, sticky, waxy binder, and enveloping webs soaked in wax tailings and secured to the opposite sides respectively of said layer, and the outside of said sheet fabric coated with dry powder.

11. A sheet-like filler piece comprising a layer of filler material which is spreadable under pressure and permanently sticky and compressible, said layer being interposed between sheets of material whose outer surfaces are coated with powdered talc.

12. A filler piece of sheet-like form, comprising outer sheets or integuments having interposed between them a layer of filler material which is sticky, pliable, water repellant and compressible when cold.

13. A shoe filler piece, of sheet-like form, comprising a layer of a sticky adhesive filler material which normally spreads freely under pressure, when applied in a shoe-bottom, and an outer skin adapted to oppose subsequent shifting of said material after it has once been so spread.

14. A shoe filler piece, of sheet-like form, comprising a layer of a permanently sticky material enclosed between outer skins which approach when the filler is expressed from between them, so as to tend to prevent return of the filler material to its original position.

15. As an article of manufacture, a sheet shoe-filler, comprising thin outside covers, at least one of which is waterproofed with a sticky material, and an intermediate layer of flexible and waterproof material which is normally plastic and capable of being spread laterally under heavy pressure and shifted with relation to the outside covers, said sheet having its sticky outer surface dulled with an inert powder.

16. A shoe-bottom filler of sheet-like form, spreadable under leveling pressure in a shoe-bottom cavity, and a protecting covering, removable at least in part without destroying said sheet-like form.

17. A shoe-bottom filler of sheet-like form adapted to flow when subjected to shoe-levelling pressure, and comprising a layer of adhesive material, and a tear-off sheet normally covering and protecting one surface of said layer, said sheet being removable to expose the under surface.

18. As an article of manufacture, a sheet fabric, comprising thin outside webs and an intermediate layer of shoe-bottom filler, at least one of said webs being of suitable and strong enough material to permit it to be stripped in whole or in part from the filler before use.

19. A laminated shoe-bottom filler piece having one lamina of expansible, compressible and moldable shoe-bottom filling material, and another lamina of non-extensible sheet material adapted to reinforce the piece and maintain its integrity as a self-sustaining piece before use.

20. A laminated shoe-bottom filler piece having one lamina of expansible, compressible and moldable shoe-bottom filling material, and another lamina of non-extensible sheet material adapted to reinforce the piece and maintain its integrity as a self-sustaining piece before use, said non-extensible sheet being externally adhesive.

21. A laminated shoe-bottom filler piece having one lamina of expansible, compressible and moldable shoe-bottom filling material, and another lamina of non-extensible sheet material adapted to reinforce the piece and maintain its integrity as a self-sustaining piece before use, said non-extensible sheet being externally adhesive, and a separating dusting of inert powder and fibrous granular substance on the outer surface of said externally adhesive sheet.

In testimony whereof, I have signed my name to this specification.

ANDREW THOMA.